(12) United States Patent
Li et al.

(10) Patent No.: US 6,616,349 B1
(45) Date of Patent: Sep. 9, 2003

(54) TWO-FIBER INTERCONNECTED RING ARCHITECTURE

(75) Inventors: Ming-Jun Li, Horseheads, NY (US); Mark J. Soulliere, Corning, NY (US); Richard E. Wagner, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/467,748

(22) Filed: Dec. 20, 1999

(51) Int. Cl.[7] .............................................. H04B 10/00
(52) U.S. Cl. .................. 398/4; 398/5; 398/59; 398/50
(58) Field of Search ................. 359/110, 119, 359/128, 130, 127

(56) References Cited

U.S. PATENT DOCUMENTS

| | | | | |
|---|---|---|---|---|
| 5,647,035 A | * | 7/1997 | Cadeddu et al. | 359/119 |
| 5,760,934 A | * | 6/1998 | Sutter et al. | 359/119 |
| 5,986,783 A | * | 11/1999 | Sharma et al. | 359/110 |
| 6,204,943 B1 | * | 3/2001 | Hamel et al. | 359/119 |
| 6,259,837 B1 | * | 7/2001 | de Boer et al. | 359/119 |
| 6,348,985 B1 | * | 2/2002 | Jiang et al. | 359/127 |
| 6,411,412 B1 | * | 6/2002 | Jiang et al. | 359/127 |

FOREIGN PATENT DOCUMENTS

| | | |
|---|---|---|
| EP | 0 677 935 A1 | 4/1995 |
| EP | 0 716 521 A2 | 12/1995 |
| EP | 0 920 153 A2 | 11/1998 |
| WO | WO 98/25365 | 6/1998 |

* cited by examiner

*Primary Examiner*—Leslie Pascal
*Assistant Examiner*—Christina Y Leung
(74) *Attorney, Agent, or Firm*—Gregory V. Bean

(57) ABSTRACT

A two-fiber ring architecture capable of carrying multiple wavelength channels and allowing client self-healing of single point failures. The ring architecture includes a two-fiber optical ring carrying at least one wavelength channel, wherein the wavelength channel has working traffic and protection traffic. The optical ring can include a single ring, two interconnected rings, or multiple interconnected rings. Specifically, the ring architecture includes a first client networking element connected to the optical ring by a first pair of 2×2 add drop matrices and a second client networking element connected to the optical ring by a second pair of 2×2 add drop matrices. At least one interconnect node is also provided when more than one ring is used, wherein the interconnect node has a first 2×2 interconnect matrix and a second 2×2 interconnect matrix. The first 2×2 interconnect matrix routes the working traffic from the first client networking element to the second client networking element. Similarly, the second 2×2 interconnect matrix routes the protection traffic from the second client networking element to the first client networking element. The optical ring includes a first access ring, an inter-office (IOF) ring, and a second access ring. Access rings are connected to the IOF ring by the aforementioned interconnect nodes.

10 Claims, 19 Drawing Sheets

TWO-FIBER INTERCONNECTED RING ARCHITECTURE

BACKGROUND OF THE INVENTION

1. Field of the Invention

The present invention generally relates to optical protection switching architectures, and more particularly to a two-fiber ring architecture providing client connection, ring interconnection, and client self-healing.

2. Technical Background

In the rapid development of highly reliable optical communication systems, networking architectures supporting this increased reliability have become increasingly complex. Ring topologies have arisen to provide a large number of networking elements with the ability to both listen and transmit on optical channels within the optical ring. In such a ring topology, consecutive nodes are connected by point-to-point links which are arranged to form a single closed path or ring.

As optical ring deployment progresses, the transition from small, isolated optical rings will not be to a single ring with a larger "diameter", but instead to interconnected rings. Thus, single channel lower speed optical rings—termed "access rings"—will soon feed higher speed backbone rings in a virtually unlimited array of speeds and sizes. For example, it is quite common today to have "low-speed" optical carriers for third level (OC-3) rings feeding OC-48 rings. Both types of rings may even be SONET four-fiber bi-directional line switched rings. In some cases, the OC-48 rings feed an even higher speed OC-192 ring spanning an entire regional service area or crossing national borders. Current approaches, however, continue to involve high costs and limited flexibility. Another difficulty is providing self-healing ring protection for non-SONET signals. More signals can be transported on a 2 or 4-fiber ring by employing wavelength division multiplexing (WDM) to send multiple channels on different wavelengths.

Another particular difficulty is associated with management of the different types of wavelength channels that may be passed among the rings. For example, a client networking element attached to one access ring wishing to communicate with a client networking element attached to another access ring must attempt to pass traffic through the central backbone, or inter-office ring (IOF ring), as well as the interconnection nodes. This technique has resulted in costly ring interconnection designs and a significant difficulty in modifying interconnection sites. Furthermore, failure of a ring interconnection node due to power outages or other problems, typically results in a shutdown of the entire optical ring. All of these shortcomings affect client connection to the ring, ring interconnection, and management of wavelength channels. It is therefore desirable to provide a method and architecture capable of efficiently handling the growing complexity of optical networks.

SUMMARY OF THE INVENTION

The above and other objects are provided by a two-fiber ring architecture capable of carrying multiple wavelength channels and allowing client self-healing from single point failures. The ring architecture includes a two-fiber optical ring carrying at least one wavelength channel, where the wavelength channel has working traffic and protection traffic. Specifically, the ring architecture also includes a first client networking element connected to the optical ring by a first add-drop node employing a first pair of 2×2 add drop matrices and a second client networking element connected to the optical ring by a second add-drop node employing a second pair of 2×2 add drop matrices. An interconnect node is also provided, wherein the interconnect node has a first 2×2 interconnect matrix and a second 2×2 interconnect matrix. The first 2×2 interconnect matrix routes the working traffic from the first client networking element to the second client networking element. Similarly, the second 2×2 interconnect matrix routes the protection traffic from the second client networking element to the first client networking element. The optical ring includes a first access ring, an inter-office (IOF) ring, and a second access ring. Access rings are connected to the IOF ring by the aforementioned interconnect nodes.

The interconnect nodes include a first interconnection site and a second interconnection site. The first interconnection site connects working traffic between the IOF ring and one of the access rings. The second interconnection site connects protection traffic between the IOF ring and one of the access rings. The first interconnection site may be physically separate from the second interconnection site for additional protection.

The present invention also provides a method for healing a single point failure in a two-fiber ring, wherein the ring has working traffic and redundant protection traffic. Specifically, the method includes the steps of connecting an upstream client networking element to the ring by a first pair of 2×2 add drop matrices, and connecting a downstream client networking element to the ring by a second pair of 2×2 add drop matrices. Self-healing is effected by performing an electrical switch at the downstream client networking element location from working traffic to protection traffic. The upstream client networking element need only insure that redundant traffic is being transmitted on the protection fiber.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
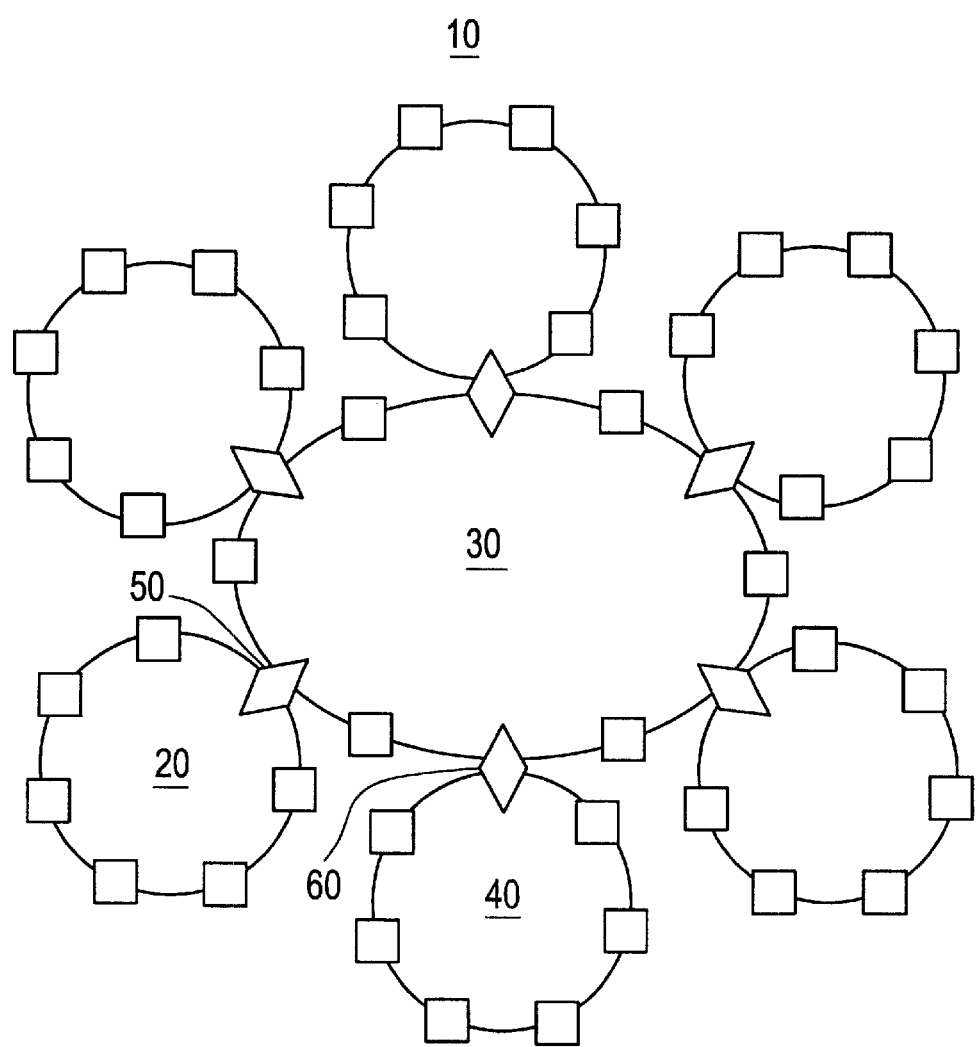
FIG. 1 is a schematic view of an interconnected ring architecture in accordance with the present invention.

Reference will now be made in detail to the present preferred embodiments of the invention, examples of which are illustrated in the accompanying drawings. Wherever possible, the same reference numerals will be used throughout the drawings to refer to the same or like parts.

Referring now to FIG. 1, a schematic view of an interconnected ring architecture 10 is shown. Generally, a central, inter-office ring (IOF ring) 30 is surrounded by a plurality of smaller access rings 20, 40. In accordance with the present invention, the access rings 20, 40 are connected to the IOF ring 30 by interconnect nodes 50, 60 to be described later. Each ring is connected to any number of client networking elements (not specifically shown) via an add drop node. The location and number of client networking elements is dictated by system requirements, client demand, and other physical restraints. While the preferred embodiment has multiple interconnected rings 20, 30, 40, one or two ring configurations can readily be used without parting from the spirit and scope of the invention.

Figure 2:
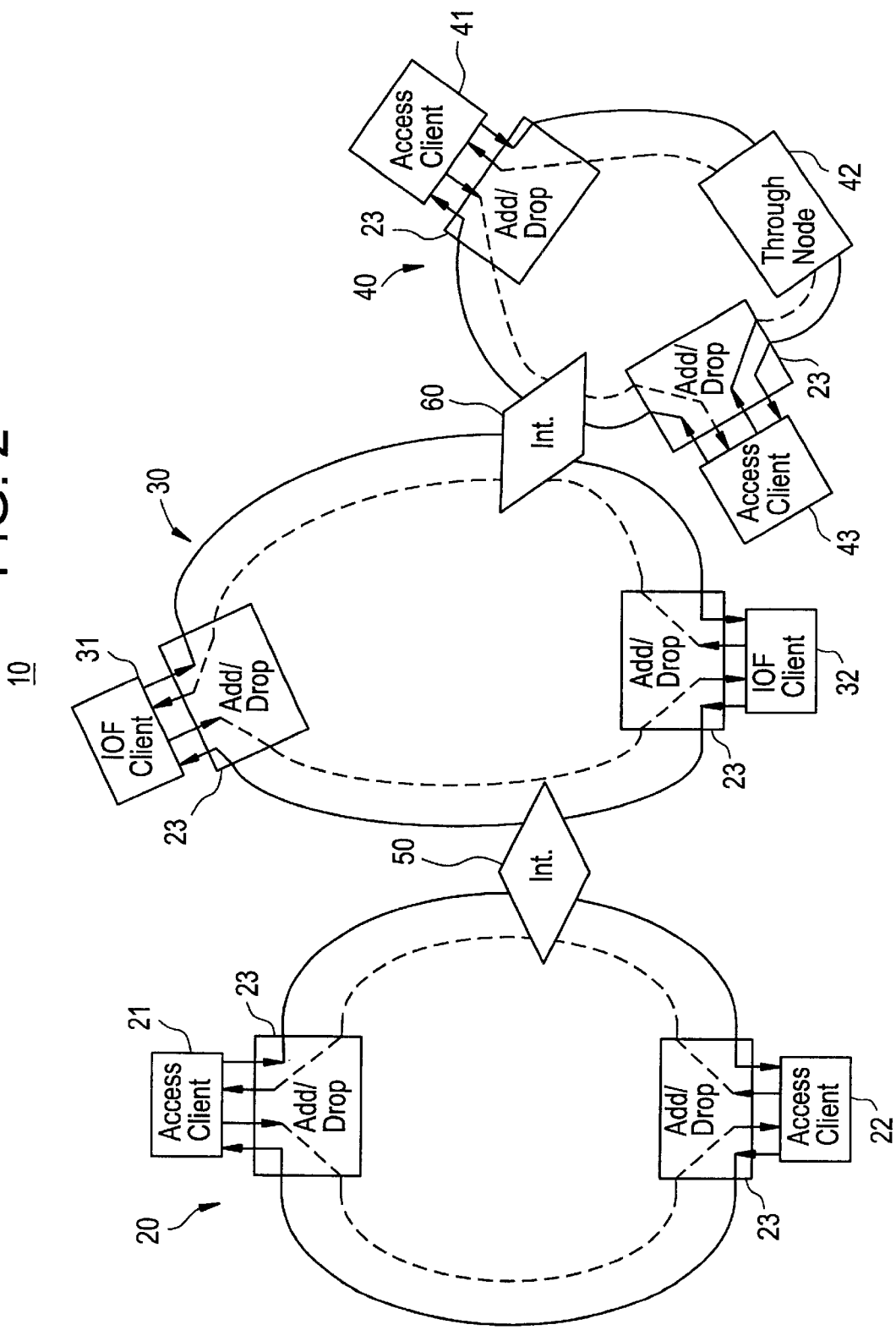
FIG. 2 is a detailed schematic view of a two-fiber ring architecture in accordance with a preferred embodiment of the present invention.

As shown in FIG. 2, a two-fiber switched ring architecture 10 in accordance with a preferred embodiment of the present invention includes an IOF ring 30, and first and second access rings 20 and 40, respectively. The rings are preferably implemented via fiber optic waveguide communication channels. It will be appreciated that the principles of the present invention can readily be used to expand ring architecture 10 to larger sized architectures such as the architecture shown in FIG. 1. It will also be appreciated that each ring 20, 30, 40 can connect to additional client networking elements as needed or desired.

Architecture 10 therefore has a two-fiber optical ring carrying one or more unique wavelength channels, wherein each wavelength channel has working traffic and protection traffic. In the preferred embodiment, the first access ring 20 is connected to a first access client 21 by a first 2×2 add drop matrix pair (to be described later), and a second access client 22 by a second 2×2 add drop matrix pair (to be described later). Similarly, the IOF ring 30 connects to a first IOF client 31 and a second IOF client 32 by 2×2 add drop matrix pairs. The second access ring 40 connects to a third access client 41 by a pair of 2×2 add drop matrices, to a fourth client 43 by a 2×2 add-drop matrix, and to a through node 42 by a 2×2 through matrix pair. The rings 20, 30, 40 are connected to each other by first interconnect node 50 and second interconnect node 60. Architecture 10 therefore provides for communication between all client networking elements as well as client initiated self-healing of any single point failures within the architecture 10. Interconnect nodes 50 and 60 are not needed when a single-ring configuration is used.

Communication among the client networking elements will now be discussed in greater detail. At least four types of communications can take place within architecture 10: communication 1) between first access client 21 and second access client 22; 2) between first IOF client 31 and second IOF client 32; 3) between first IOF client 31 and third access client 41; and 4) between first access client 21 and third access client 41. It will be appreciated that inter-ring communication includes all client networking elements along the communication path and the specified clients are by example only. It will further be appreciated that each type of communication is placed on a separate wavelength channel $\Sigma_j$.

Figure 5:
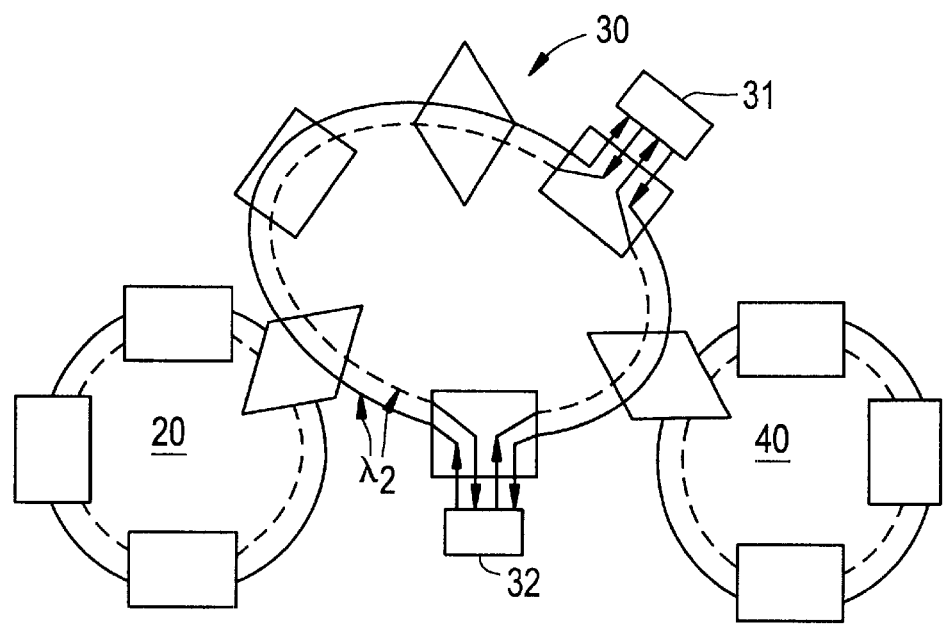
FIG. 5 is a schematic view of an optical wavelength channel contained within an inter-office ring.
Figure 6:
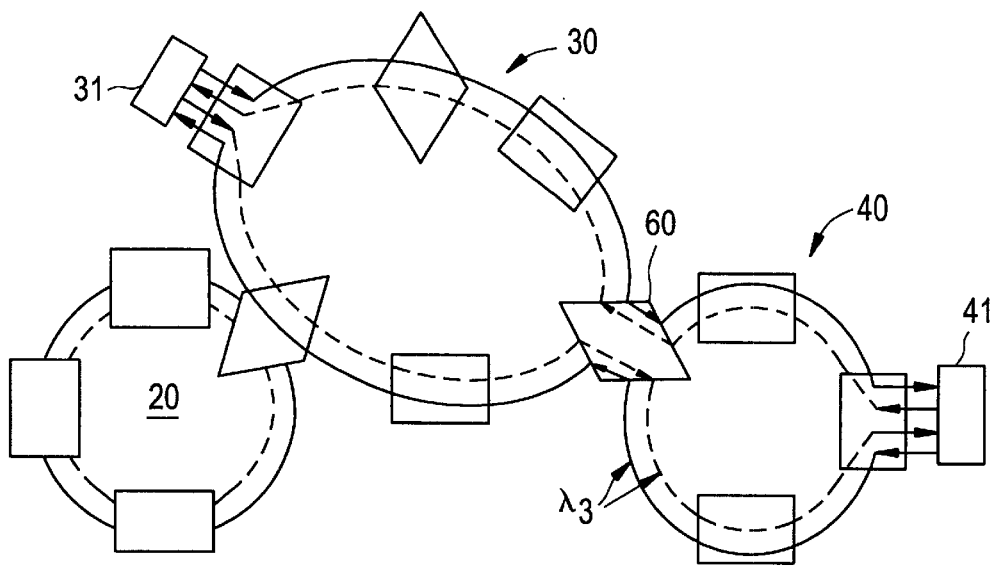
FIG. 6 is a schematic view of an optical wavelength channel transmitted between an inter-office ring and an access ring.
Figure 7:
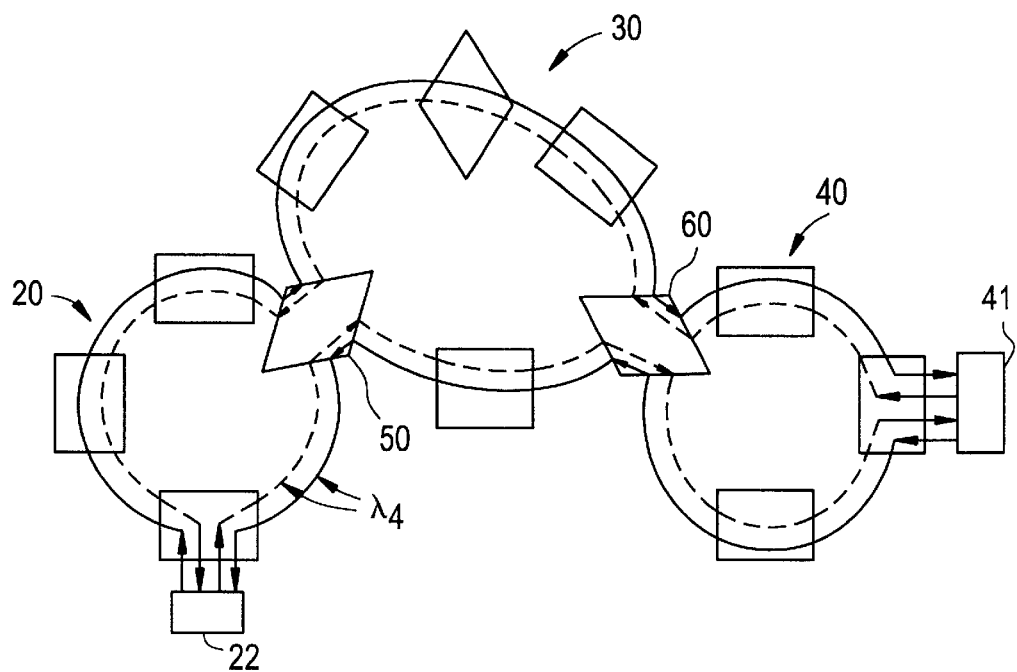
FIG. 7 is a schematic view of an optical wavelength channel transmitted between two access rings.

FIGS. 4–7 better illustrate the possible types of communications between client networking elements. It will be appreciated that certain nodes in the architecture 10 will not participate in certain types of communications and are therefore shown as empty boxes for the purposes of discussion. For example, it can be seen in FIG. 4 that first access client 21 communicates with second access client 22 on wavelength $\Sigma_1$. FIG. 5 demonstrates that first IOF client 31 communicates with second IOF client 32 on wavelength $\Sigma_2$. It can be appreciated from FIG. 6 that first IOF client 31 communicates on wavelength $\Sigma_3$ with third access client 41. Furthermore, FIG. 7 shows that second access client 22 communicates with third access client 41 on wavelength $\Sigma_4$. Wavelength division is provided via multiplexers and demultiplexers to be discussed below.

Figure 3:
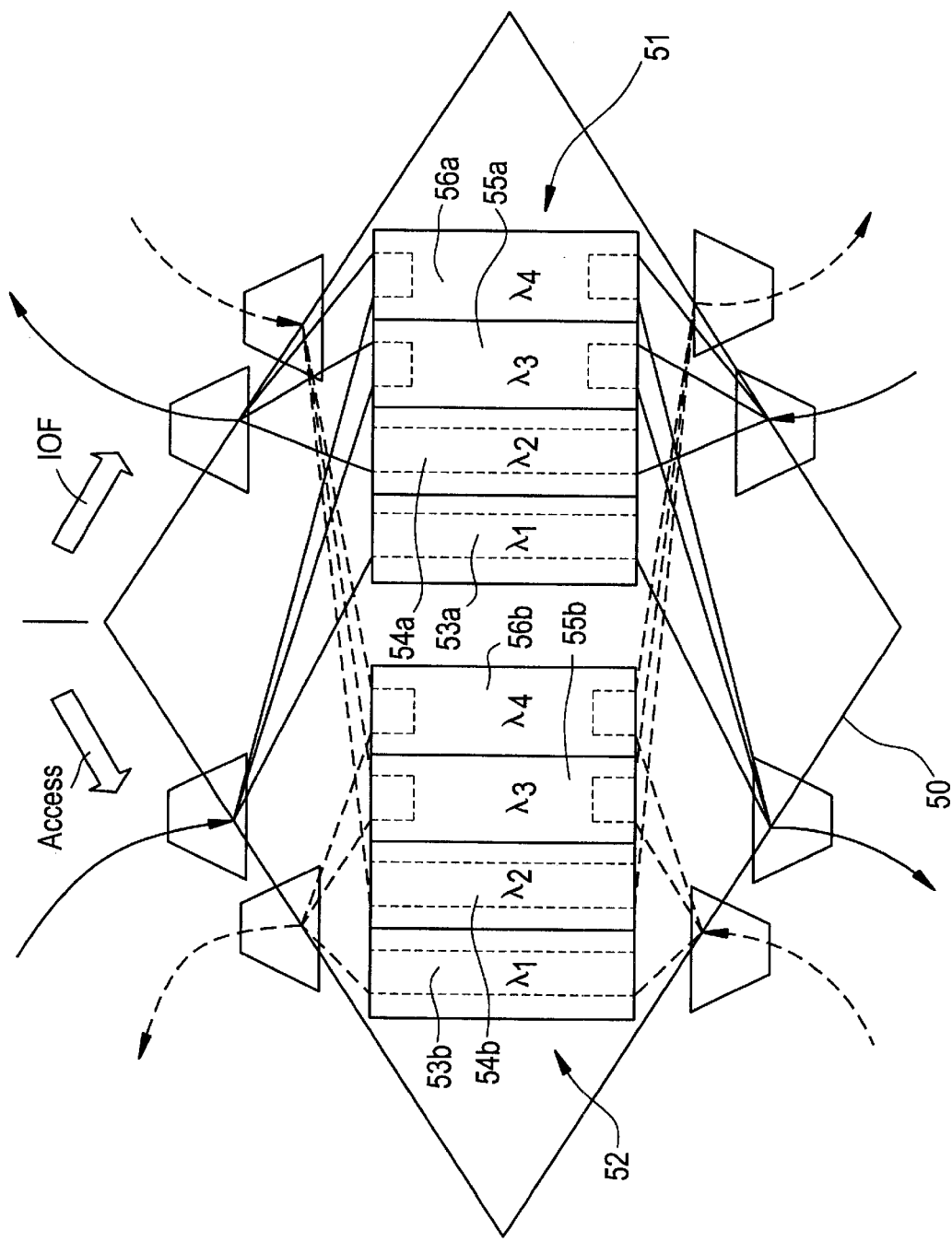
FIG. 3 is a diagram of an interconnect node in accordance with the present invention.
Figure 4:
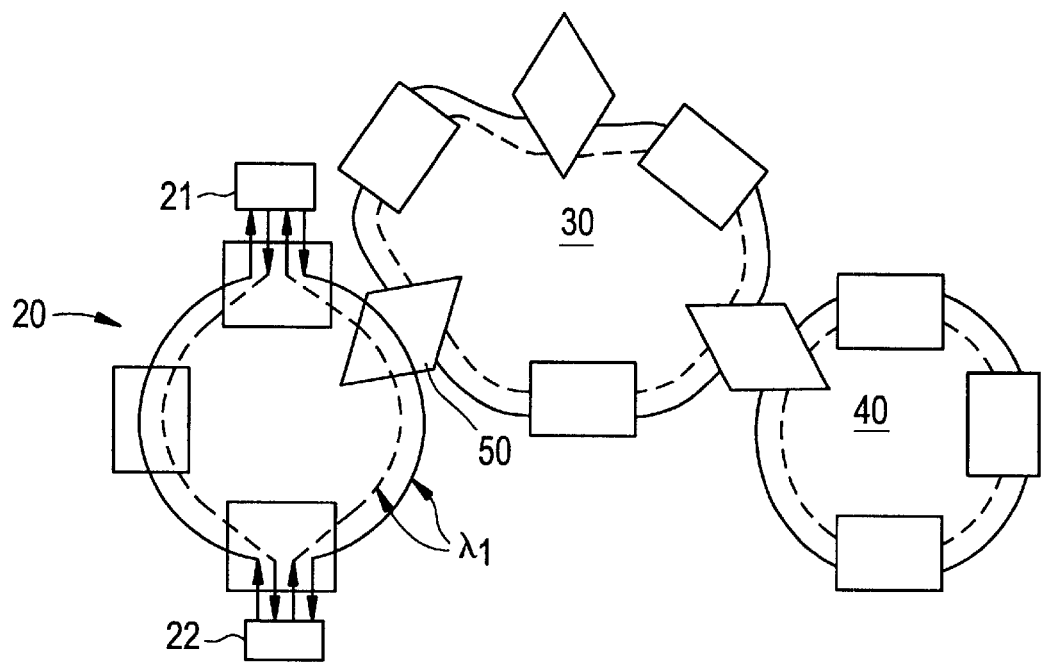
FIG. 4 is a schematic view of an optical wavelength channel contained within an access ring.

Interconnect nodes 50 and 60 will now be described in greater detail. It will be appreciated that design of interconnect nodes 50 and 60 to support the desired number of wavelengths allows architecture 10 to support increasingly complex ring structures as illustrated in FIG. 1. Turning now to FIG. 3, it can be seen that first interconnect node 50 has a pair of 2×2 interconnect matrices for each wavelength channel $\Sigma_1$–$\Sigma_4$. Specifically, each interconnect matrix pair has a first 2×2 interconnect matrix 53a, 54a, 55a, 56a for photonically routing the working traffic from the first client, such as first access client 21, to the second client, such as second access client 22, and a second 2×2 interconnect matrix 53b, 54b, 55b, 56b for photonically routing the protection traffic from the second client to the first client. Routing within each matrix 53–56 is designed to be either pass-through or cross-over routing depending on the type of communication for which the wavelength channel is being used.

Thus, for the first type of traffic between first access client 21 and second access client 22, $\Sigma_1$ interconnect matrix pair 53 pass the working and protection traffic directly through. This is because the two clients are located on the same ring. Similarly, for traffic between first IOF client 31 and second IOF client 32, $\Sigma_2$ interconnect matrix pair 54 pass protection and working traffic directly through.

For traffic between rings, however, the interconnect matrices cross-over incoming traffic in order to route the traffic from one ring to the other. For example, with reference to FIGS. 2 and 3, for traffic between first access client 21 and first IOF client 31, $\Sigma_3$ interconnect matrix pair 55 cross-over incoming working traffic as well as incoming protection traffic. For traffic between first access client 21 and third access client 41, first interconnect node 50 and second interconnect node 60 (see FIG. 2) both perform the necessary crossing-over of working and protection traffic to route the traffic between all three rings. Therefore, 4 interconnect matrix pair 56 performs the necessary routing.

Figure 8:
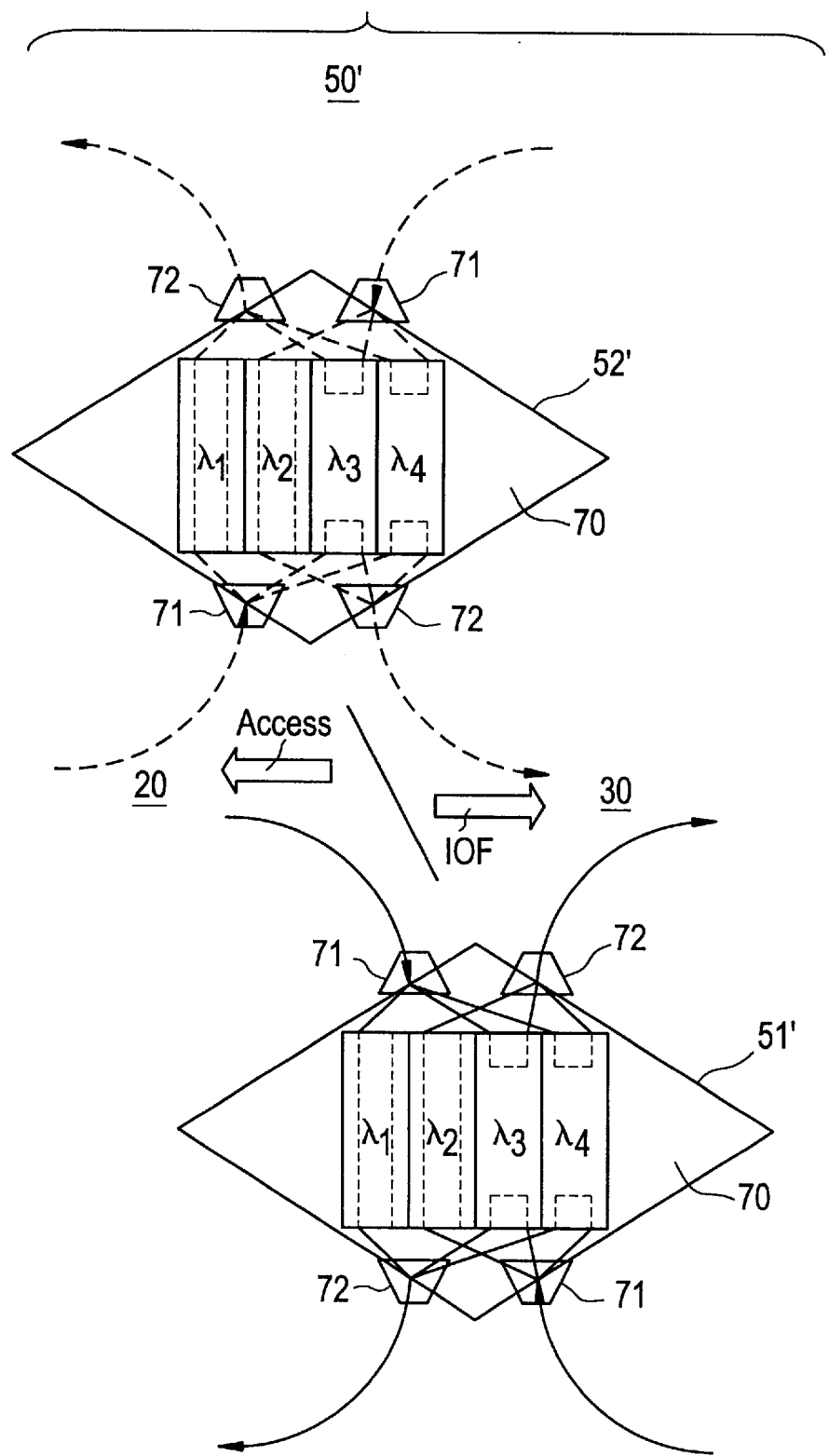
FIG. 8 is a diagram of an interconnect node in accordance with the preferred embodiment of the present invention.

Referring now to FIG. 8, the preferred embodiment of interconnect node 50 is shown at 50'. It will be appreciated that the possibility of power failure at an interconnect node 50, 60 presents a unique problem with respect to self-healing as will be discussed below. At any rate, it is desirable to interconnect working traffic and redundant protection traffic at different locations to avoid complete shutdown of architecture 10 in the event of power failure or other major malfunction. Thus, a first interconnection site 51' may be disposed physically separate from a second interconnection site 52'. First interconnection site 51' connects working traffic between IOF ring 30 and first access ring 20 and within the rings. The first interconnection site therefore routes working traffic between the rings by crossing-over the traffic. Second interconnection site 52' connects protection traffic between IOF ring 30 and first access ring 20, wherein the second interconnection site 52' routes the protection traffic between the rings via the cross-over mechanism discussed above. Second interconnect node 60 performs a similar function with respect to second access ring 40 and IOF ring 30.

Preferably, each interconnect node 50, 60 also has a wavelength-selective switch card shown generally at 70 for controlling operation of the interconnect matrices 53–56, wherein each interconnect matrix is a wavelength-selective switch matrix (sometimes known as a liquid crystal switch). Wavelength-selective switches of the type suitable for this application are well known among those skilled in the art. For example, U.S. Pat. No. 5,875,272 to Kewitsch describes the operation of one embodiment of a typical wavelength-selective switch, and the description contained in the specification and drawings is incorporated herein by reference as though fully set forth. Each site further includes a pair of demultiplexers 71 for separating traffic into individual wavelength channels $\Sigma_1$–$\Sigma_4$. Each interconnected wavelength channel $\Sigma_3$, and $\Sigma_4$, is therefore reversed by the corresponding interconnect matrix 55, 56 and routed between the rings 20, 30, 40. Each site further includes a pair of multiplexers 72 for combining each wavelength channel for transmission along the optical fibers. The interconnect nodes 50, 60 are therefore structured to allow maximum flexibility as well as reliable protection from failure of an entire interconnection site.

Figure 9:
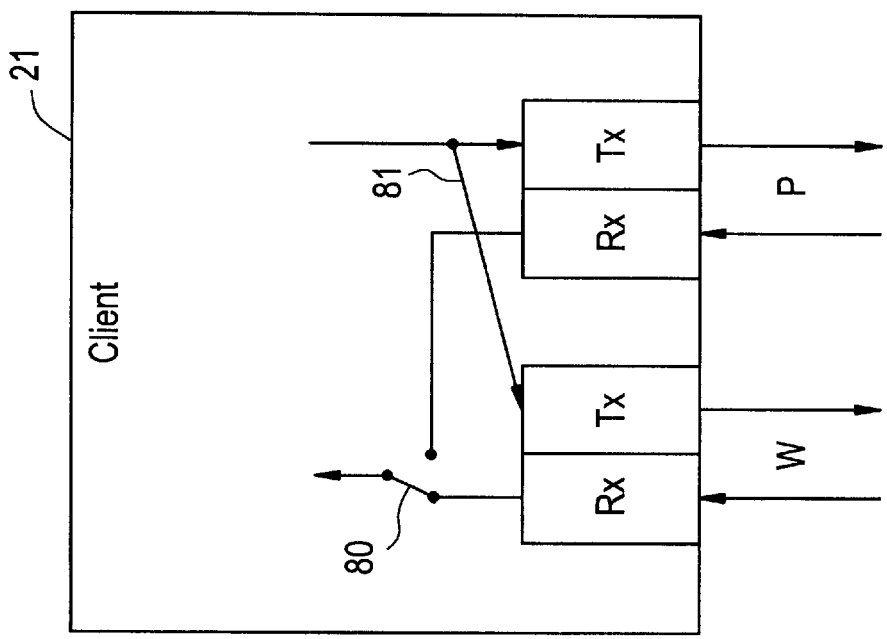
FIG. 9 is a schematic diagram of a client networking element switching structure.

The ability of architecture 10 to allow self-healing of single point failures will now be discussed in greater detail. As already discussed, each client networking element 21, 22, 31, 32, 41 is connected to the optical ring by a pair of 2×2 add drop matrices. As shown in FIG. 9, architecture 10 provides each client networking element with the ability to self-heal without the requirement of signaling among the different nodes on the ring. Specifically, each client networking element 21, 22, 31, 32, 41 uses 1+1 transmitter and receiver protection which bridges the client signal to two transmitters. This creates two redundant optical signals. Redundancy is therefore provided by electrical bridge 81. If both of these signals are received at a client networking element, then the client networking element creates two electrical signals and chooses the best via electrical switch 80.

Figure 10:
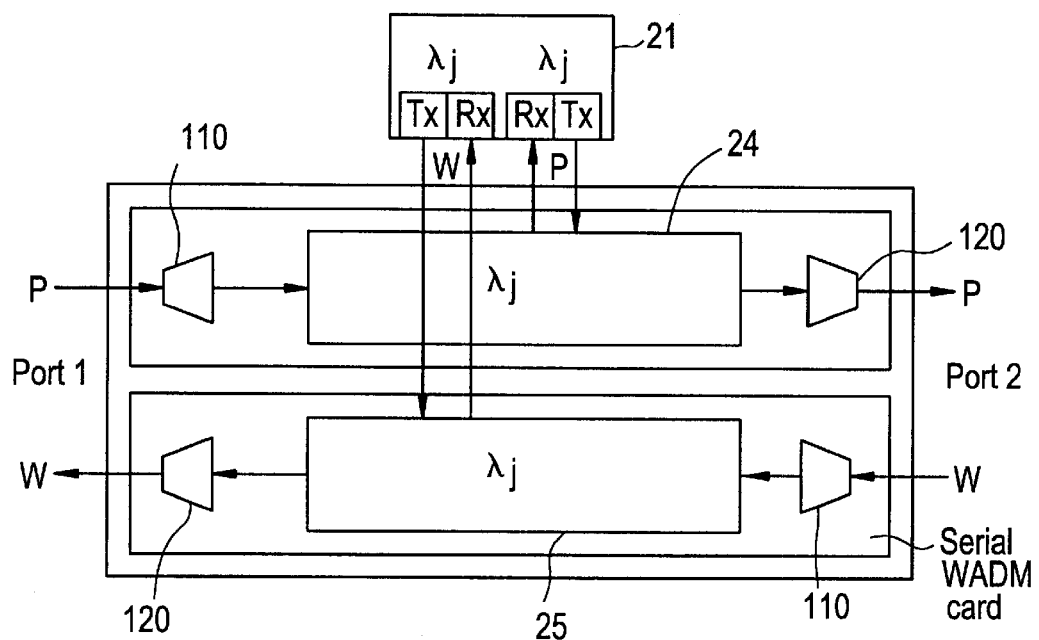
FIG. 10 is a diagram of a client networking element connection to an optical ring in accordance with the present invention.
Figure 11:
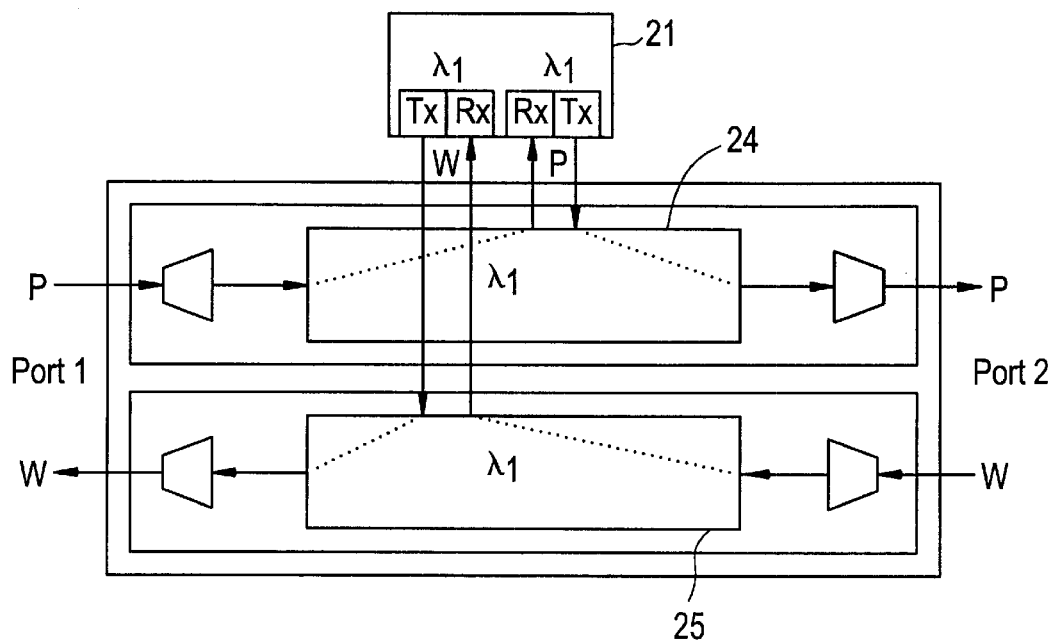
FIG. 11 is a diagram of a client networking element connection to a wavelength channel contained within an access ring.

Turning now to FIG. 10, connection of first access client 21 to the access ring 20 is shown in greater detail. While connection of first access client 21 is shown here, the same principle is applicable to all add drop nodes in architecture 10. The connection includes a pair of 2×2 add drop matrices 24 and 25 for connecting first access client 21 to the access ring 20. It will be appreciated that 2×2 add drop matrix pair 24 and 25 is shown here generally for all wavelength channels $\Sigma_j$ and that wavelength division is provided by demultiplexers 110 and multiplexers 120. Turning to FIG. 11, it can be seen that first 2×2 add drop matrix 24 routes protection traffic P to and from first access client 21, while second 2×2 add drop matrix 25 routes working traffic W to and from first access client 21. While wavelength channel $\Sigma_1$ is shown here, it is preferred that similar connections be provided for all wavelength channels. Furthermore, it is preferred that 2×2 add drop matrices are wavelength-selective matrices.

Figure 12:
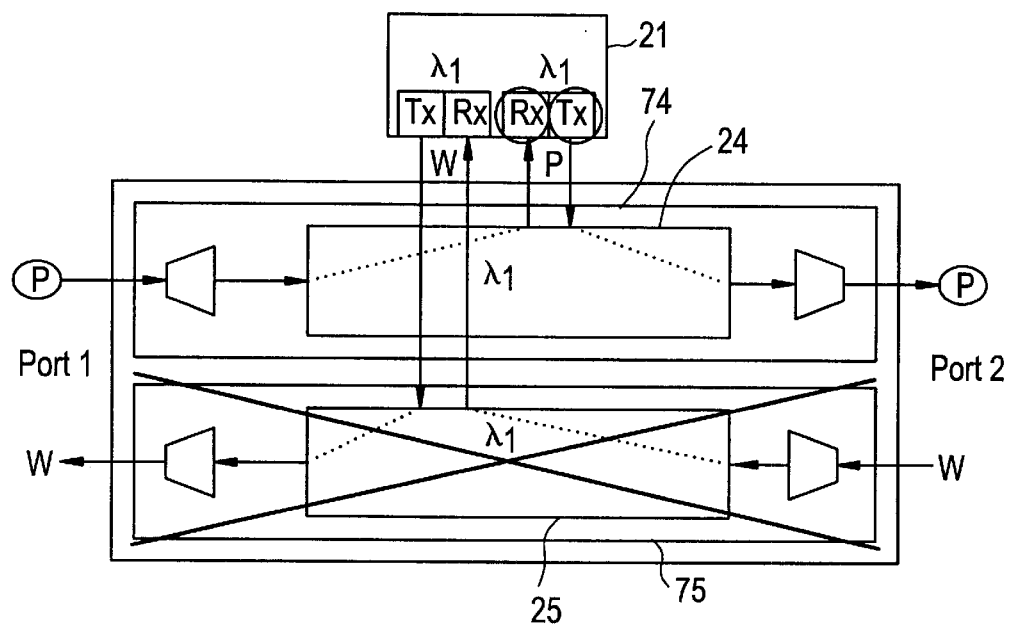
FIG. 12 is a diagram of a single point failure in a 2×2 add drop matrix assigned to working traffic.
Figure 13:
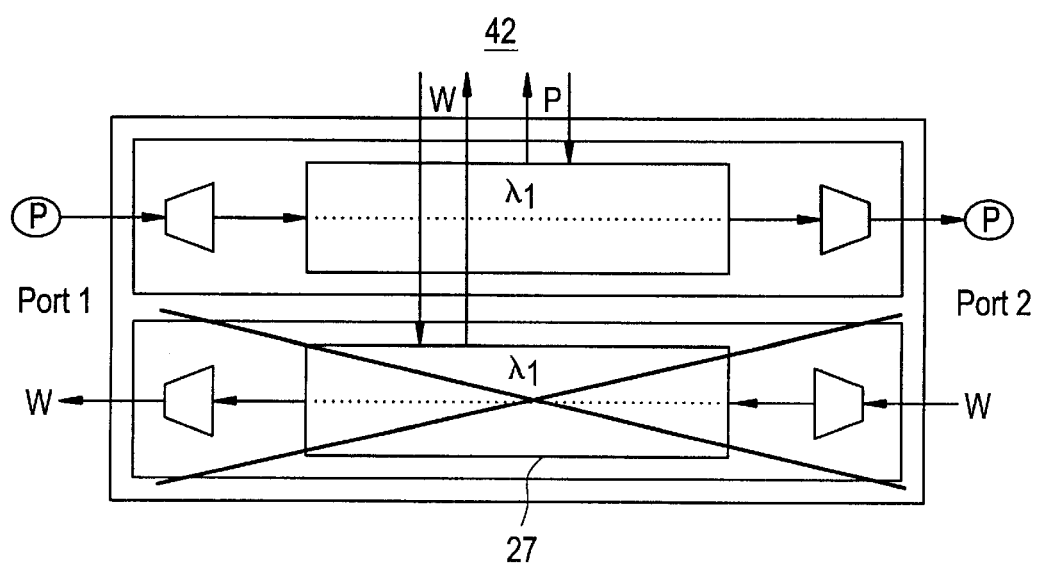
FIG. 13 is a diagram of a single point failure of a 2×2 matrix assigned to working traffic within a through node.
Figure 14:
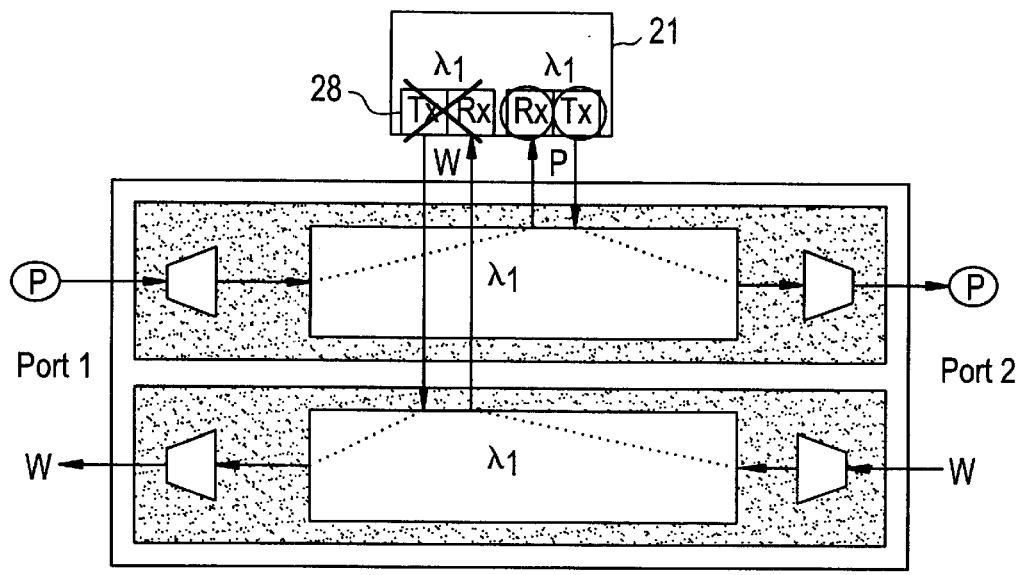
FIG. 14 is a diagram of a single point failure in a client networking element transmit/receive component assigned to working traffic.
Figure 15:
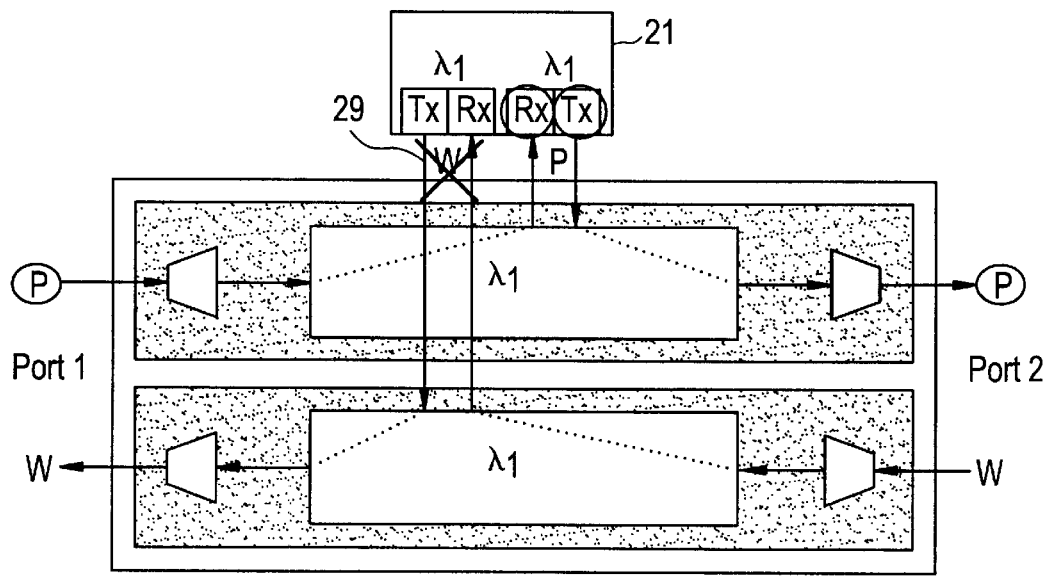
FIG. 15 is a diagram of a single point failure in a client networking element working span.
Figure 16:
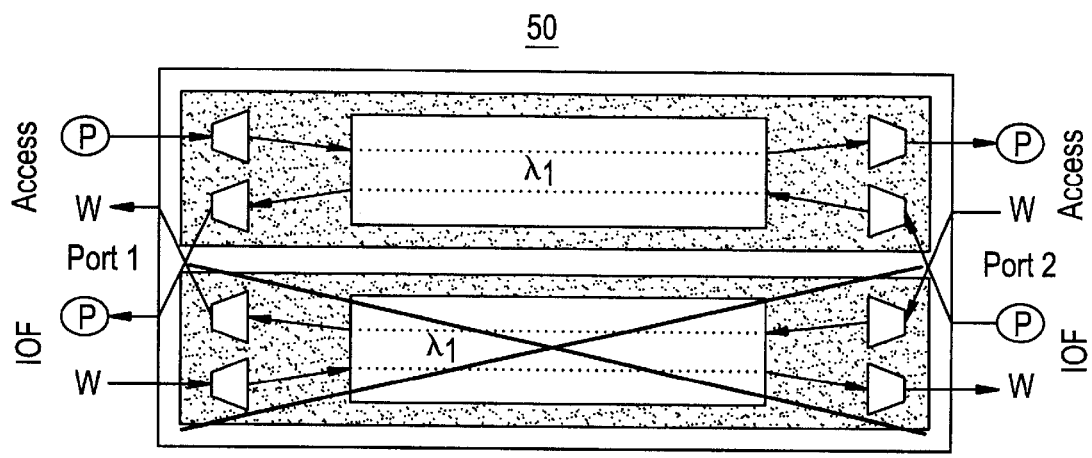
FIG. 16 is a diagram of a single point failure in a 2×2 interconnect matrix assigned to working traffic for a wavelength channel contained within an inter-office ring.
Figure 17:
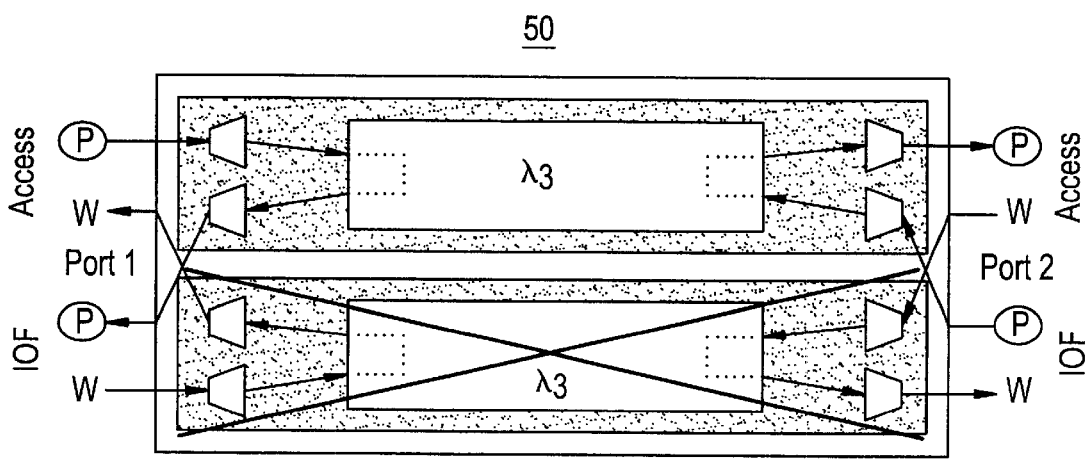
FIG. 17 is a diagram of a single point failure of a 2×2 interconnect matrix assigned to working traffic for a wavelength channel between an access ring and an inter-office ring.

Thus, with respect to single point failures such as those shown in FIGS. 12–17, there is an upstream client located upstream from the single point failure and a downstream client located downstream from the single point failure. In the event of a break in working traffic W, the downstream client merely selects protection traffic P from the first 2×2 add drop matrix 24. In fact, FIG. 12 illustrates that an entire add drop matrix 25 can be lost without significantly affecting the downstream client. FIG. 13 illustrates that the loss of a 2×2 through matrix 27 can occur at a through node 42 (see FIG. 2). FIGS. 14 and 15 demonstrate that a single point failure can occur at a client networking element transmitter/receiver 28 (FIG. 14), or a client networking element working span 29 (FIG. 15) without affecting traffic. FIGS. 16 and 17 demonstrate that architecture 10 provides for self-healing in the event of failure of any 2×2 interconnect matrix. For example, it can be appreciated from FIG. 16 that failure of matrix 53a assigned to $\Sigma_1$, working traffic at interconnection site 51 does not prevent operation of ring architecture 10. Furthermore, FIG. 17 shows that client self-healing can be performed in the event of failure of matrix 55a assigned to $\Sigma_3$ working traffic.

Figure 18:
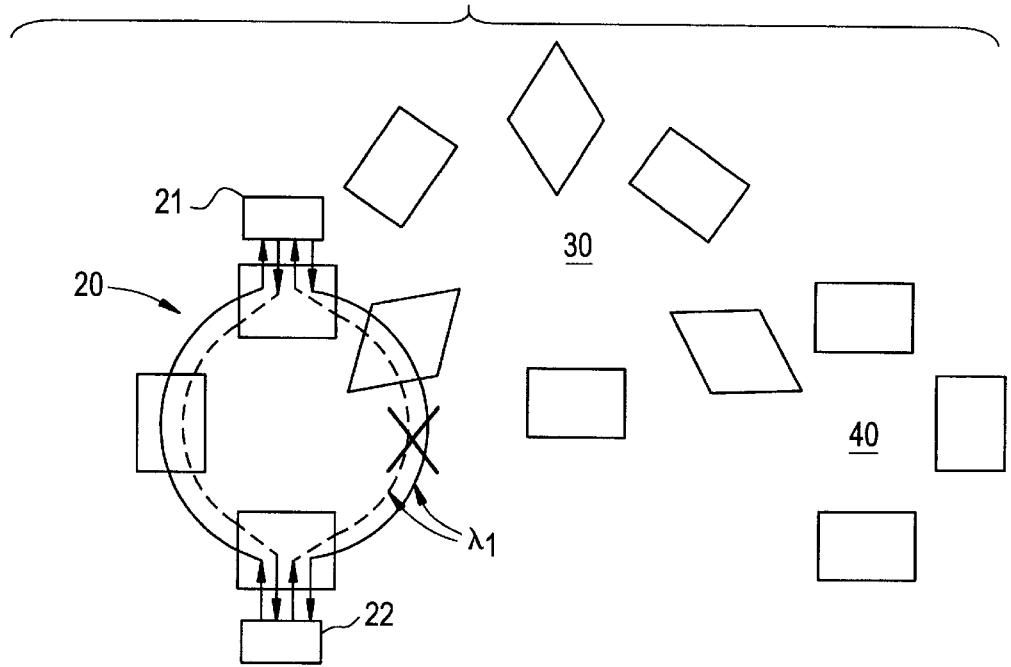
FIG. 18 is a diagram of a cable cut of a wavelength channel contained within an access ring.
Figure 19:
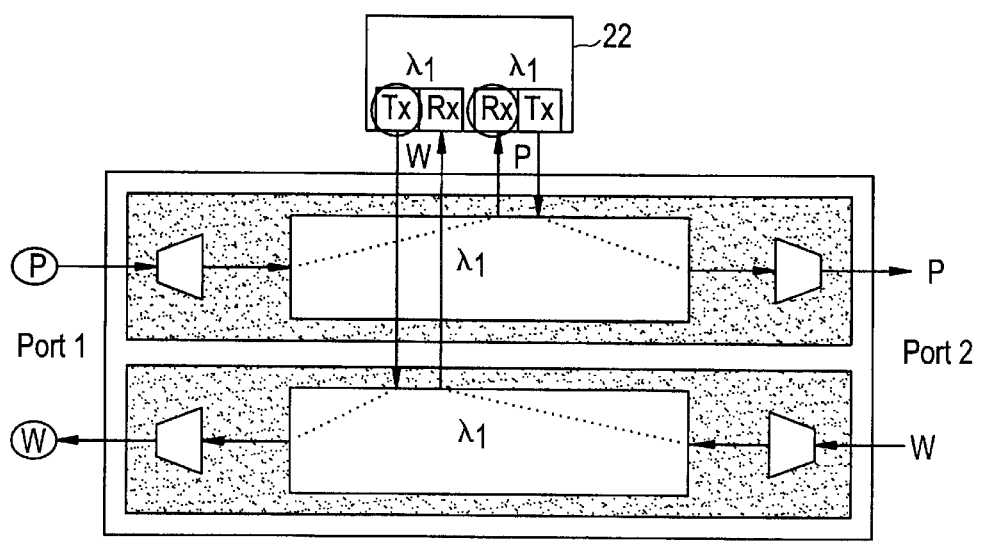
FIG. 19 is a diagram of the second access client in FIG. 18.
Figure 20:
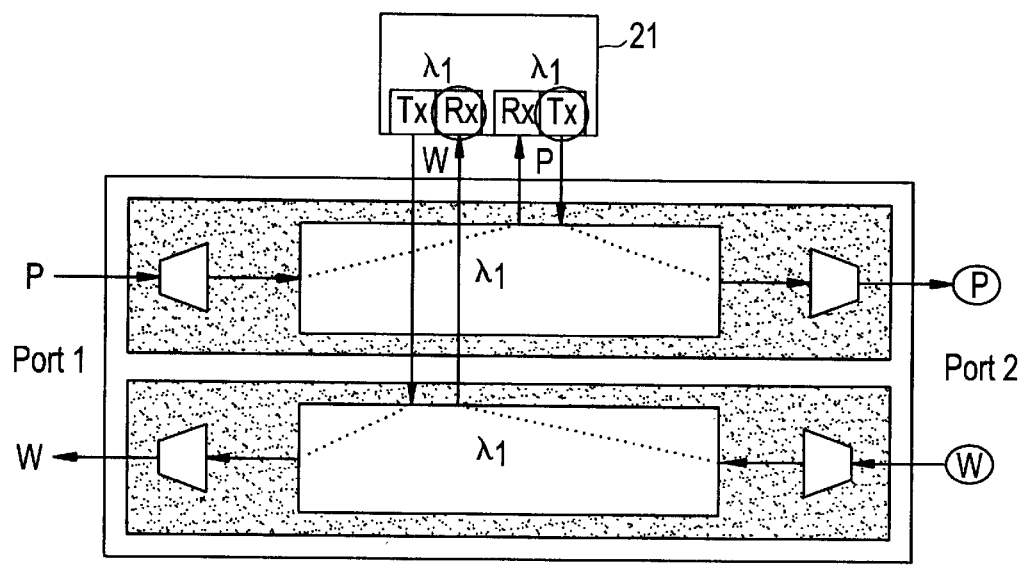
FIG. 20 is a diagram of the first access client in FIG. 18.

It will be appreciated that the above self-healing discussion applies to interruptions either in working traffic connections or protection traffic connections only. In the event of a cable cut, however, both working and protection traffic is interrupted and electrical switching must occur at two networking clients, as shown in FIGS. 18–32. Specifically, FIGS. 18–20 illustrate the self-healing process for a cable cut of wavelength channel $\Sigma_1$. Here, second access client 22 is downstream from the cable cut, whereas first access client 21 is upstream. Second access client 22 continues to transmit on both the working and protection fibers, but performs an internal switch to receive from the protection fiber because the client is downstream from the single point failure. It will be appreciated that first access client 21 continues to receive from the working fiber but transmits on both the working and the protection fibers.

Figure 21:
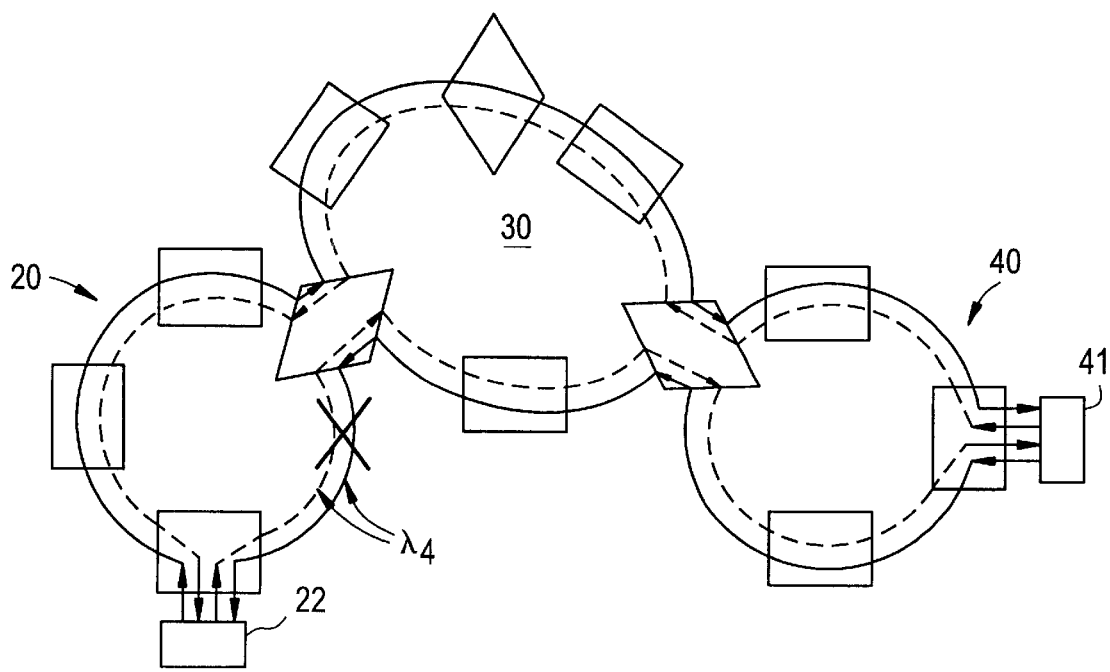
FIG. 21 is a diagram of a cable cut of a wavelength channel transmitted between access rings and occurring in an access ring.
Figure 22:
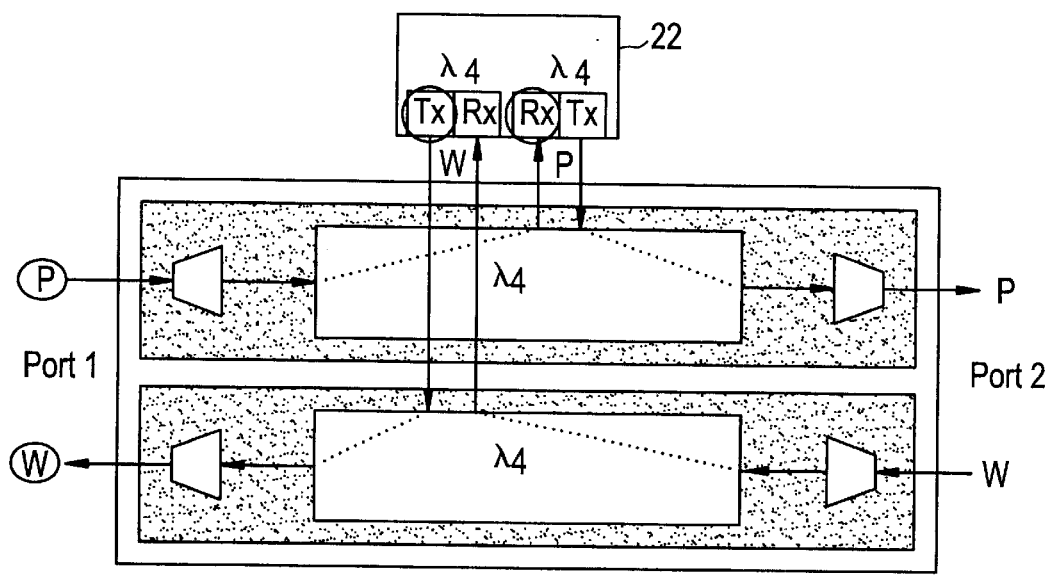
FIG. 22 is a diagram of the second access client of FIG. 21.
Figure 23:
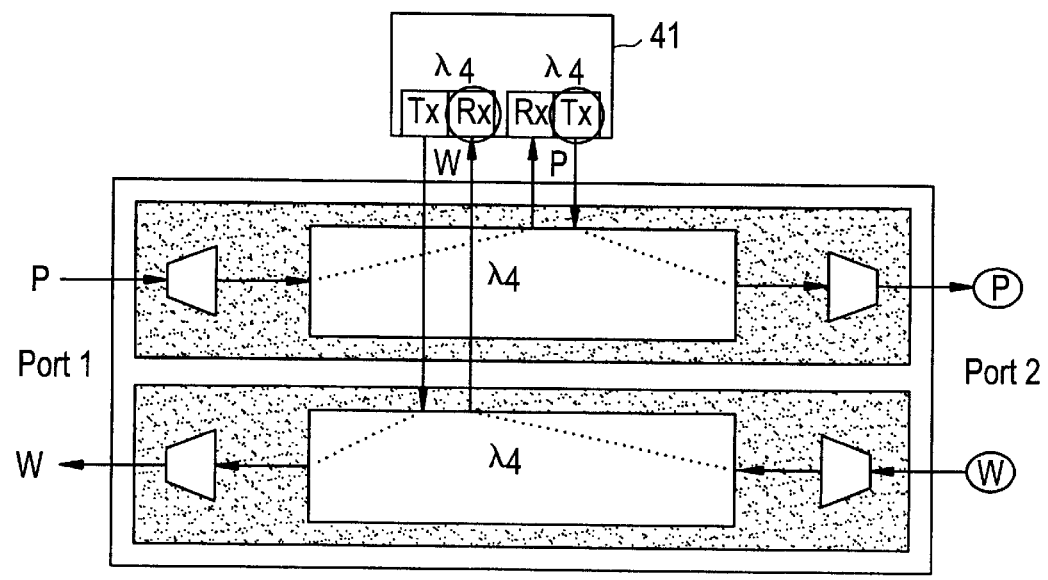
FIG. 23 is a diagram of the third access client of FIG. 21.

FIGS. 21–23 illustrate the switching involved with a cable cut of wavelength channel $\Sigma_4$. Here, the cable cut is on an access ring, such as access ring 20. It is important to note that a cable cut can also occur on the IOF ring 30 which will be discussed later. In any event, FIGS. 22 and 23 show that second access client 22 continues to transmit on the working fiber but switches to receive from the protection fiber. This is because second access client 22 is downstream from the single point failure. Third access client 41 is upstream from the cable cut and therefore continues to receive from the working fiber.

Figure 24:
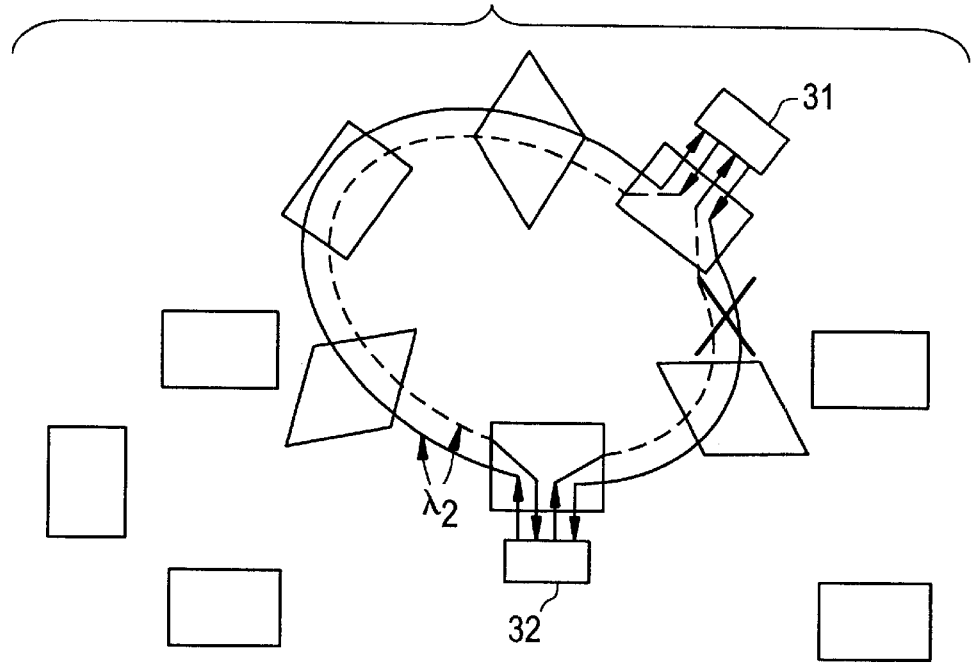
FIG. 24 is a diagram of a cable cut of a wavelength channel contained within an inter-office ring.
Figure 25:
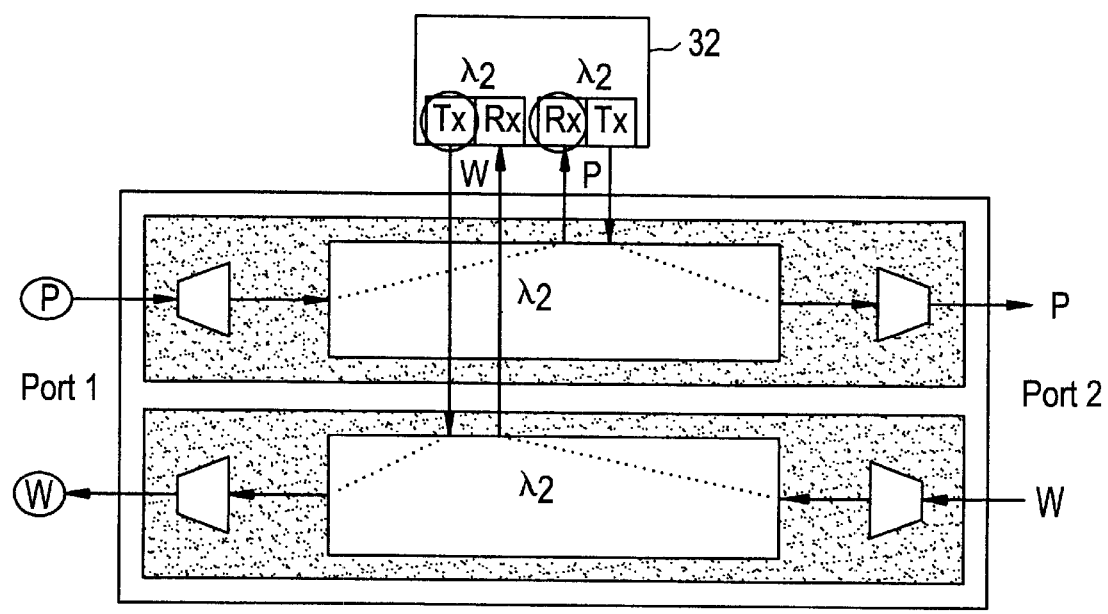
FIG. 25 is a diagram of the second inter-office client of FIG. 24.
Figure 26:
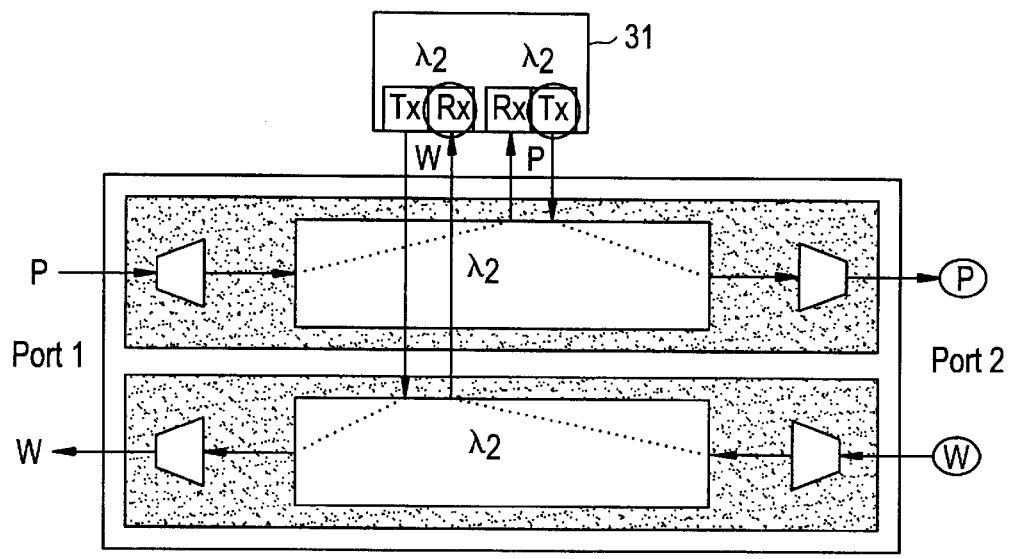
FIG. 26 is a diagram of the first inter-office access client of FIG. 24.

FIGS. 24–26 demonstrate the self-healing process associated with a cable cut of wavelength channel $\Sigma_2$. Specifically, FIG. 25 shows that once again the downstream client, second IOF client 32, selects protection traffic from the pair of 2×2 add drop matrices. As seen in FIG. 26, first IOF client 31 transmits to the working and protection fibers as part of the self-heal.

Figure 27:
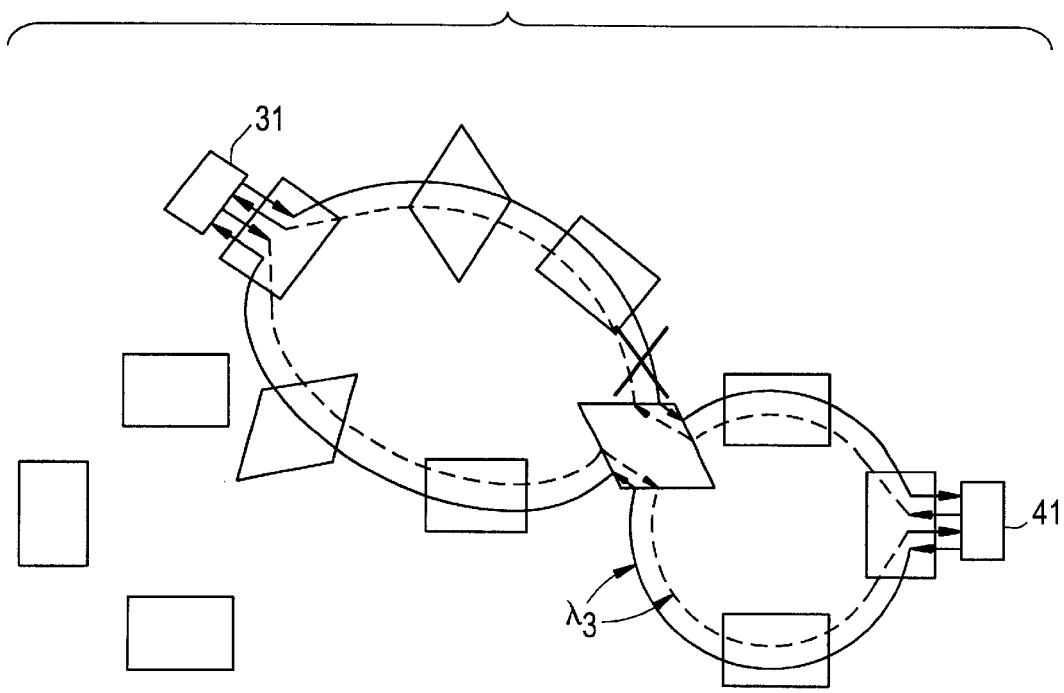
FIG. 27 is a diagram of a cable cut of a wavelength channel transmitted between an inter-office ring and an access ring.
Figure 28:
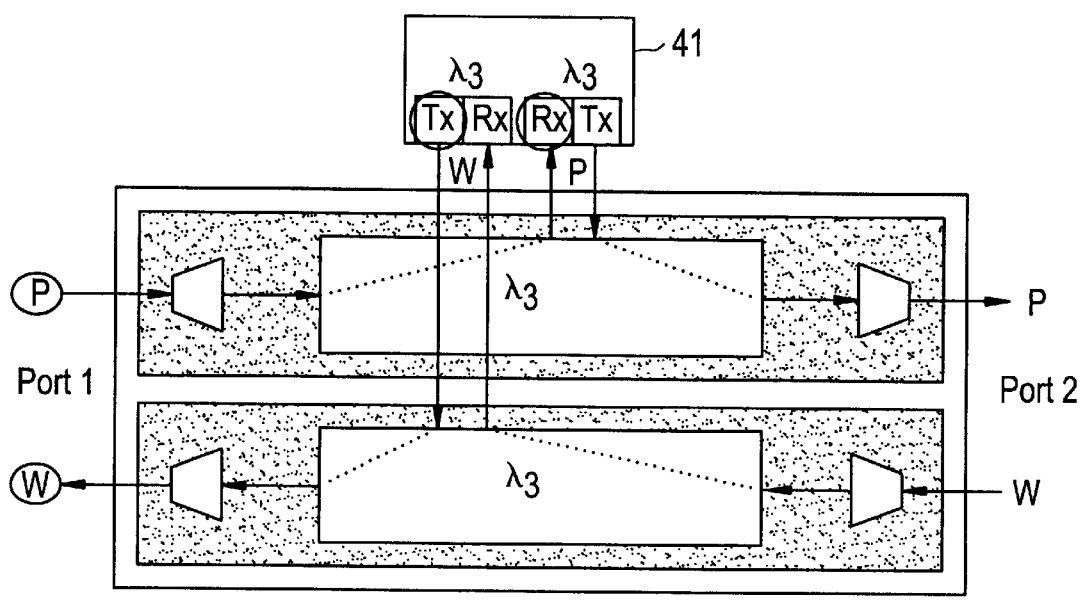
FIG. 28 is a diagram of the third access client of FIG. 27.
Figure 29:
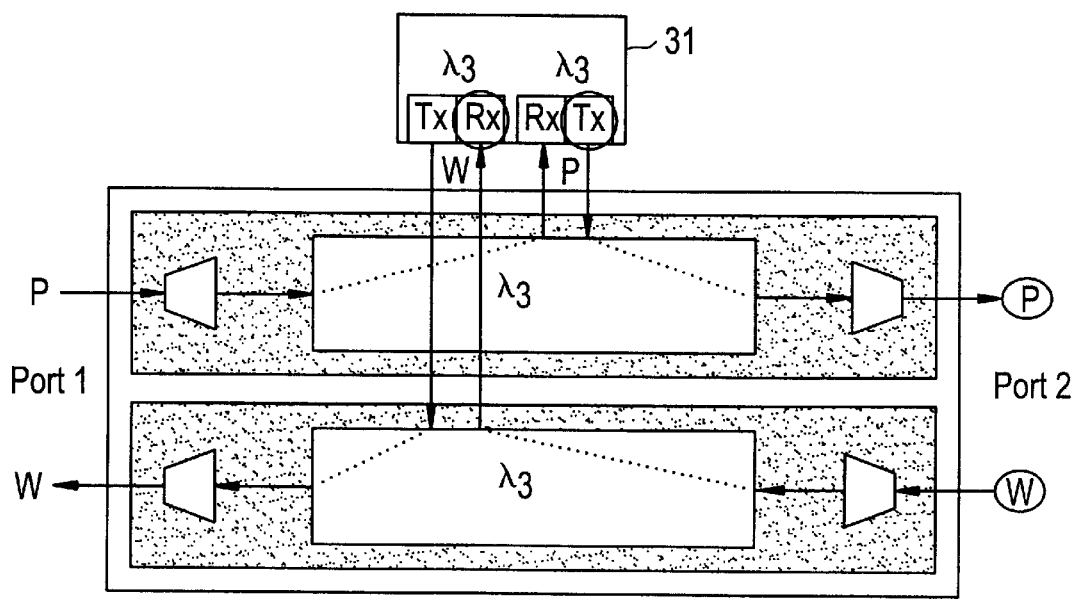
FIG. 29 is a diagram of the first inter-office client of FIG. 27.

Turning now to FIGS. 27–29, a cable cut of wavelength channel $\Sigma_3$ is shown in greater detail. From FIG. 29, it can be appreciated that first IOF client 31 is upstream from the single point failure and can continue to receive working traffic. As seen in FIG. 28, however, third access client 41, must switch to protection traffic as noted above.

Figure 30:
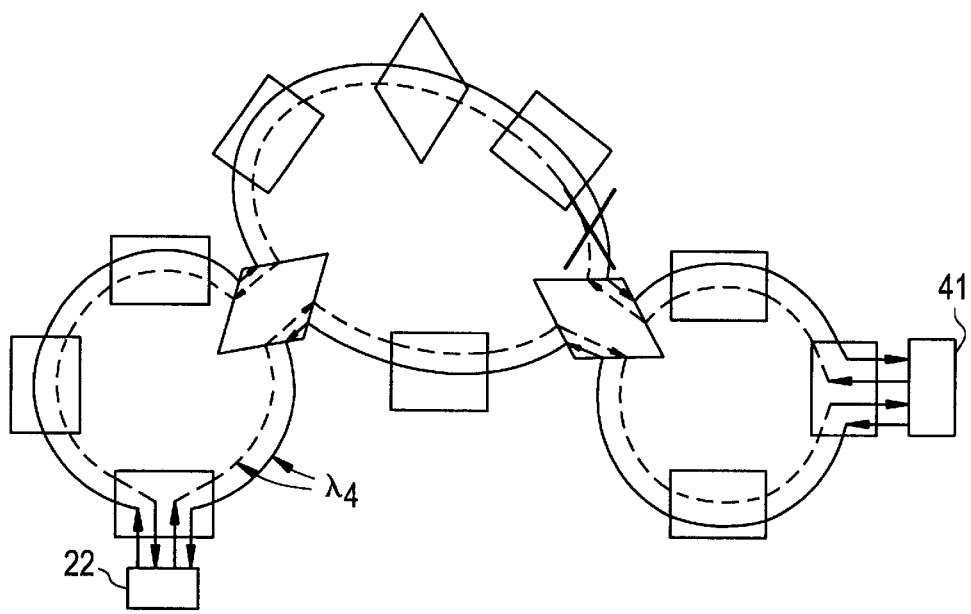
FIG. 30 is a diagram of a cable cut of a wavelength channel transmitted between access rings and occurring in an inter-office ring.
Figure 31:
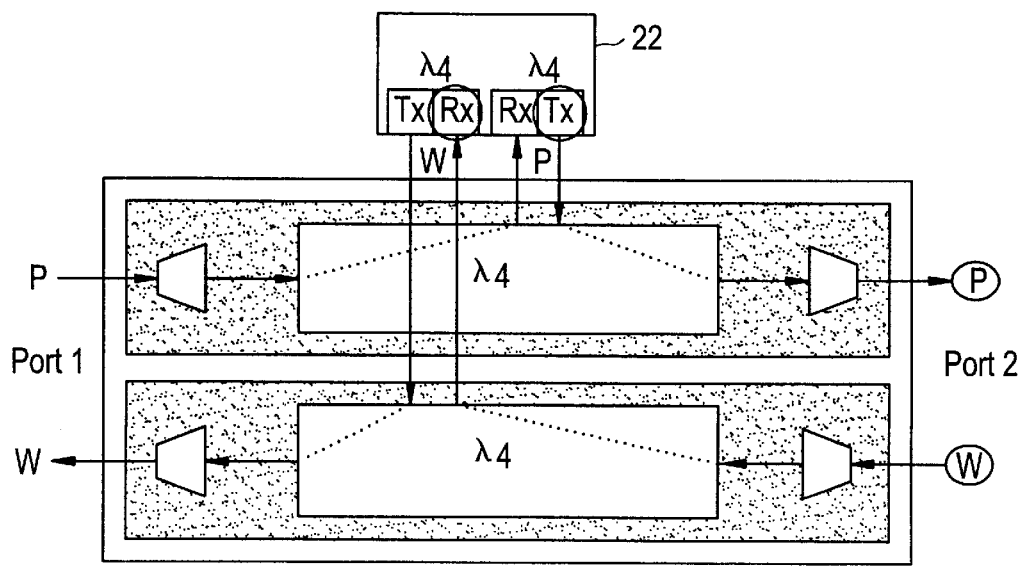
FIG. 31 is a diagram of the second access client of FIG. 30.
Figure 32:
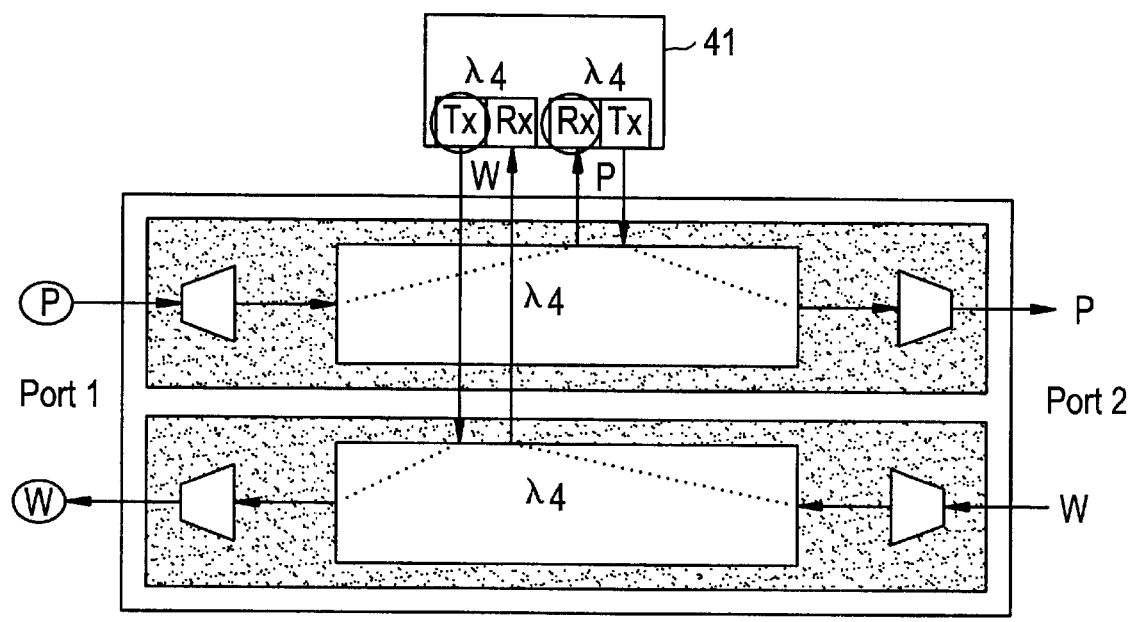
FIG. 32 is a diagram of the third access client of FIG. 30.

Finally, FIGS. 30–32 illustrate a self-heal when a cable cut occurs in IOF ring 30 with respect to wavelength channel $\Sigma_4$. In this example, the downstream client is third access client 41. Therefore, FIGS. 32 and 31 demonstrate that the switch to receiving protection traffic occurs at third access client 41 on second access ring 40. It is important to note that the self-healing process outlined above requires no signaling among networking clients or nodes on the interconnected ring. Furthermore, the 2×2 switching matrices do not have to perform any optical switching because the switching is done electrically at the affected client networking element.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An optical ring interconnect node for use with multiple wavelengths, working traffic, protection traffic, a first ring, and a second ring, the optical ring interconnect node comprising:
   a first interconnection site structured and arranged so as to be able to connect, selectively and independently for each wavelength, the working traffic between the first ring and the second ring, and so as not to receive any of the protection traffic either between the first ring and the second ring or within either of said rings; and
   a second interconnection site structured and arranged so as to be able to connect, selectively and independently for each wavelength, the protection traffic between the first ring and the second ring, and so as not to receive any of the working traffic between the first ring and the second ring or within either of said rings.

2. The optical ring interconnect node of claim 1 wherein the first interconnection site is physically separate from the second interconnection site.

3. The optical ring interconnect node of claim 2 for use with traffic wherein the first interconnection site and the second interconnection site each further includes:
   a pair of demultiplexers for separating the traffic into individual wavelength channels;
   a pair of 2×2 interconnect matrices for each wavelength channel, each pair of 2×2 interconnect matrices reversing the traffic and routing the traffic between the first ring and the second ring; and
   a pair of multiplexers for combining each wavelength channel.

4. The optical ring interconnect node of claim 3 wherein each of the pair of 2×2 interconnect matrices is a wavelength-selective switch matrix, the optical ring interconnect node further including a wavelength-selective switch card controlling operation of the pair of 2×2 interconnect matrices.

5. A two-fiber interconnected ring architecture for use with working traffic and protection traffic on two or more interconnected rings, the two-fiber interconnected ring architecture comprising:
   first and second two-fiber optical rings with each fiber carrying a plurality of wavelength channels, the wavelength channels each having working traffic and protection traffic;
   a first client networking element connected to the first ring by a first add-drop node; and
   a first interconnect node, interconnecting the first ring and the second ring, the first interconnect node comprising:
      a first 2×2 interconnect matrix for crossing over the working traffic and not the protection traffic, selectively individually by wavelength, between the first ring and the second ring; and
      a second 2×2 interconnect matrix for crossing over the protection traffic and not the working traffic, selectively individually by wavelength, between the first ring and the second ring.

6. The architecture of claim 5 wherein the first client networking element is connected to the first two-fiber optical ring by a first add-drop node employing a first pair of 2×2 add drop matrices.

7. The architecture of claim 5 further comprising a second client networking element connected to the second two-fiber optical ring.

8. The architecture of claim 7 wherein the first client networking element is connected to the first two-fiber optical ring by a first add-drop node employing a first pair of 2×2 add drop matrices, and wherein the second client networking element is connected to the second two-fiber optical ring by a second add-drop node employing a second pair of 2×2 add drop matrices.

9. The architecture of claim 5 wherein said first interconnect node is structured and arranged such that said first 2×2 interconnect matrix for crossing over the working traffic is physically separated from said second 2×2 interconnect matrix for crossing over the protection traffic so as to minimize the possibility of simultaneous failure of said first 2×2 interconnect matrix and said second 2×2 interconnect matrix.

10. The architecture of claim 5 further comprising a third two-fiber optical ring carrying a plurality of wavelength channels, the wavelength channels each having working traffic and protection traffic, and a second interconnect node, interconnecting the second ring and the third ring, the second interconnect node comprising a third 2×2 interconnect matrix for crossing over the working traffic and not the protection traffic, selectively individually by wavelength, between the second ring and the third ring; and a fourth 2×2 interconnect matrix for crossing over the protection traffic and not the working traffic, selectively individually by wavelength, between the second ring and the third ring.

* * * * *